United States Patent

[11] 3,559,675

| [72] | Inventors | Adolf Schoepe<br>1620 N. Raymond Ave., Fullerton, Calif. 92631;<br>Fredric E. Schmuck, 535 Century Drive, Anaheim, Calif. 92805 |
|---|---|---|
| [21] | Appl. No. | 808,853 |
| [22] | Filed | Mar. 20, 1969 |
| [45] | Patented | Feb. 2, 1971 |

[54] FLUID FLOW PASSAGE AND VALVE ASSEMBLY FOR BALL COCKS
3 Claims, 5 Drawing Figs.

[52] U.S. Cl. ................................................ 137/436, 137/441, 137/414
[51] Int. Cl. ................................................ F16k 31/14
[50] Field of Search ........................................ 137/441, 414, 413, 436, 434, 315; 251/120, 121

[56] References Cited
UNITED STATES PATENTS

| 2,752,938 | 7/1956 | Owens | 137/441X |
| 2,779,350 | 1/1957 | Owens | 137/436X |
| 3,194,258 | 7/1965 | Grant | 137/414 |

Primary Examiner—Alan Cohan
Attorney—Mahoney, Hornbaker and Schick

ABSTRACT: A water inlet member is secured extending upwardly into a water tank and is telescoped by a water outlet member with a valve assembly secured to the inlet member and overlying an upper edge of the outlet member providing valve control communication between the inlet member and interiorly of the outlet member. During assembly, a valve housing member is pressed onto the inlet member and simultaneously tightly engages a thin, continuously circular upper edge of the outlet member sealing therebetween. The outlet member includes an angularly upwardly extending refill hose connection spaced downwardly from the outlet member upper edge and above main water outlet openings, a series of spaced fingers being positioned filtering water passing out the refill hose connection. A guide on the valve assembly mounts a float controlling the valve operation and a refill hose extends from the refill hose connection upwardly into a refill tube.

INVENTORS
ADOLF SCHOEPE,
FREDRIC E. SCHMUCK
BY
MAHONEY, HORNBAKER
& SCHICK
ATTORNEYS

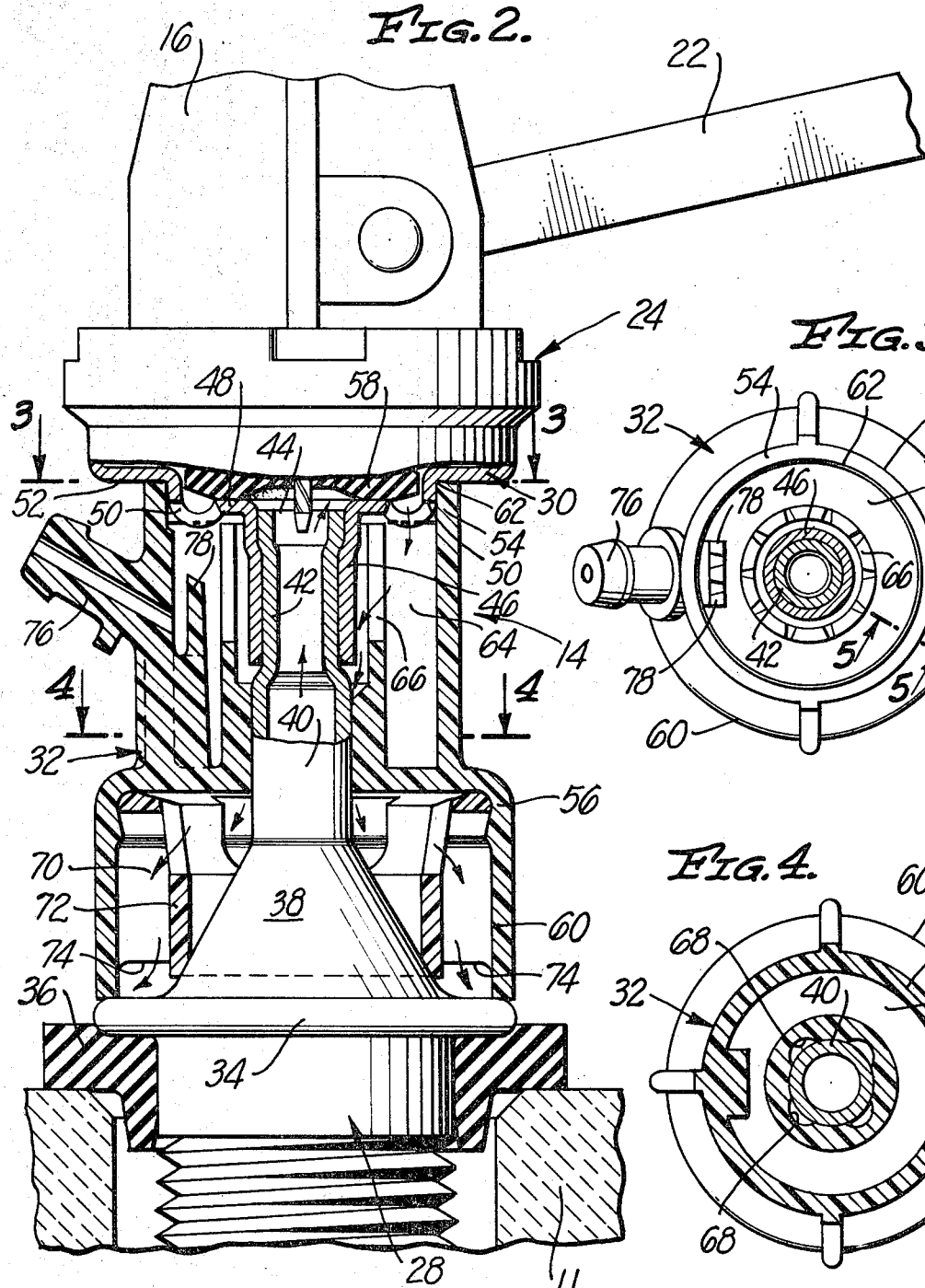
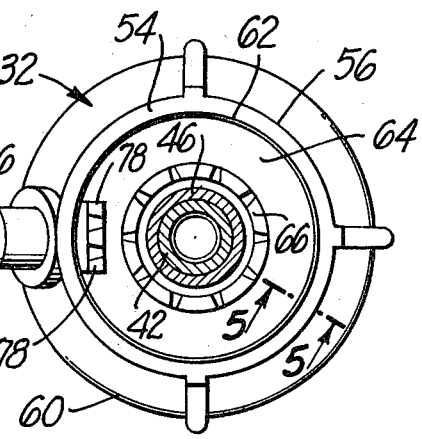
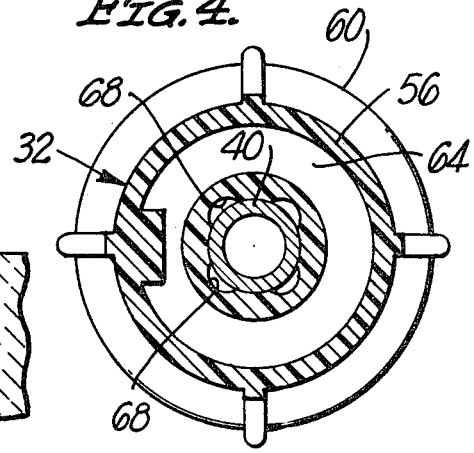
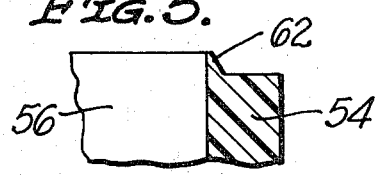
INVENTORS
ADOLF SCHOEPE,
FREDRIC E. SCHMUCK
BY
MAHONEY, HORNBAKER
& SCHICK
ATTORNEYS

FLUID FLOW PASSAGE AND VALVE ASSEMBLY FOR BALL COCKS

CROSS REFERENCE TO RELATED APPLICATIONS

This invention is an improvement on our prior U.S. Pat. No. 3,429,333, entitled, "Ball Cock," and issued Feb. 25, 1969.

BACKGROUND OF THE INVENTION

This invention relates to a particular construction of ball cock primarily for use in controlling the water inflow and water level in a water or flush tank. More particularly, this invention relates to an improved construction and assembly of water inlet member, valve and water outlet member of a ball cock providing improved sealing between the valve and water outlet member, and providing an improved connection between the outlet member and a refill hose normally used in conjunction with such a ball cock As hereinbefore pointed out, the present inventions constitute the improvements on the ball cock construction shown, described and claimed in our prior U.S. Pat. No. 3,429,333, issued Feb. 25, 1969, and principally involve an improved lower assembly thereof including the water inlet member, the valve controlling the flow of water into the tank and the outlet member from which the water is directed into the tank. In general construction, the ball cock of said patent is formed with the water inlet member thereof projecting upwardly through the tank bottom wall into the interior of the tank and the valve assembly is centrally secured to an end of the inlet member. A generally tubular water outlet member is telescoped over the water inlet member extending downwardly beneath a lower wall of the valve assembly and providing a water outlet chamber receiving water from the valve assembly and directing such water outwardly into the tank.

A refill hose connection projects outwardly from the water outlet member internally communicating through spaced water filtering fingers with the water of the outlet chamber, being externally connected to a refill hose projecting upwardly by the valve assembly and communicating with an upper end of a refill tube. A guide extends upwardly from the valve assembly and vertically movably mounts a float operably connected to the valve assembly for controlling the inflow of water therethrough. Thus, when the water level in the tank permits the float to reach a minimum lower level, the float actuates the valve assembly causing water flow from the inlet member, over a valve seat of the valve assembly into the outlet member outlet chamber and from the outlet chamber into the tank interior, while at the same time, a portion of said water flow is from the outlet member outlet chamber into the refill hose ultimately to the refill tube. When the water level in the tank raises the float to a predetermined height, the valve assembly seals off the water flow between the inlet and outlet members.

In the assembly of the lower unit of the ball cock, a lower housing portion of the valve assembly is pressed onto an end of the inlet member and, at the same time, a lower surface of this valve housing portion is received downwardly tightly abutting an annular end of the outlet member telescoped with the inlet member. During this pressed assembly, difficulties have been occasioned by the fact that the refill hose connection has been formed at the upper end of the outlet member having a relatively small supplementary outlet chamber projecting outwardly from the outlet member with the filtering spaced fingers positioned in said supplementary chamber. Although the major portion of the outlet member upper end is circular, at the refill hose connection and the supplementary outlet chamber therefor, an outward projection must be formed at this upper end so that when the valve assembly is pressed onto the inlet member upper end and it is attempted to seat the valve housing portions squarely on the upper end of the outlet member, this irregular shape caused by the refill hose connection permits misalignment between the various components creating production assembly difficulties and, on occasion, defective final assemblies.

Still further difficulties have been encountered with this lower assembly of the ball cock occasioned by the particular projection of the refill hose connection from the water outlet member. In the ball cock construction of our patent, the refill hose connection in the form of a nipple to which the refill hose is connected projects horizontally outwardly from the water outlet member requiring one end of the refill hose to be similarly positioned in this horizontal projection. From the refill hose connection of this lower assembly, however, the refill hose must extend upwardly by the valve assembly to above the ball cock float with the other end thereof positioned for directing water into the upper end of the refill tube.

Obviously, with such required extension of the refill hose, such hose must first project horizontally from the refill hose connection, then curve sharply upwardly to beyond a vertical extension of the refill tube and then reversely nearly vertically downwardly toward the end of the refill tube. Furthermore, the constant water flow and interruptions in water flow caused by the required operation of the valve assembly creates flexing of the refill hose in this relatively severe curved extension thereof. The overall result is that there have been occasions of refill hose failure at the solid connection thereof to the refill hose connection of the ball cock lower assembly.

OBJECTS AND SUMMARY OF THE INVENTION

It is, therefore, an object of this invention to overcome the stated difficulties with the prior ball cock construction. According to the present invention, the refill hose connection is repositioned downwardly on the water outlet member away from the valve abutting upper end thereof and the supplementary outlet chamber is likewise completely eliminated. Furthermore, the refill hose connection is repositioned in its extension from the water outlet member to provide a less severe curvature of the refill hose in the extension of the refill hose from the ball cock lower assembly to the end of the refill tube It is a further object of this invention to provide an improved lower assembly for ball cocks of the type herein involved wherein the water outlet member presents a continuously circular upper end for abutment with the valve housing lower surface during the pressing of the valve assembly onto the water inlet member so that misalignments between the various components cannot occur and the dangers of improper assembly are virtually eliminated. As hereinbefore discussed, when the valve assembly is pressed downwardly onto the upper end of the water inlet member, the lower surface of the valve housing must tightly seat on and abut the upper end of the water outlet member, and according to the present invention, the refill hose connection is repositioned spaced downwardly from the outlet member upper end permitting such upper end to be continuously circular and uninterrupted by any irregularities caused by the refill hose connection. At the same time, the repositioning of the refill hose connection is accomplished with an elimination of the supplementary outer chamber leading thereto, somewhat simplifying the outlet member configuration.

It is still a further object of this invention to provide an improved lower assembly for ball cocks as hereinbefore set forth wherein the refill hose connection is positioned projecting outwardly from the water outlet member angling upwardly generally toward the valve assembly. Thus, the refill hose connected to this upwardly angled refill hose connection is required to extend over less severe curvature in its extension upwardly by the valve assembly and ball cock float to the upper end of the refill tube. The resulting less severe curvature of the refill hose reduces the flexing thereof during the ball cock operation and eliminates difficulties from refill hose failures previously occasioned by such flexing.

Other objects and advantages of the invention will be apparent from the following specification and the accompanying drawing which are for the purpose of illustration only.

BRIEF DESCRIPTION OF THE DRAWINGS

FIG. 2 is an enlarged, fragmentary, part vertical-sectional and part side-elevational view of the lower assembly of the ball cock of FIG. 1.

FIG. 3 is a horizontal sectional view looking in the direction of the arrow 3–3 in FIG. 2.

FIG. 4 is a horizontal sectional view looking in the direction of the arrow 4–4 in FIG. 2, and FIG. 5 is enlarged, fragmentary, vertical section view looking in the direction of the arrows 5–5 in FIG. 3.

DESCRIPTION OF THE BEST EMBODIMENT CONTEMPLATED

Figure 1:
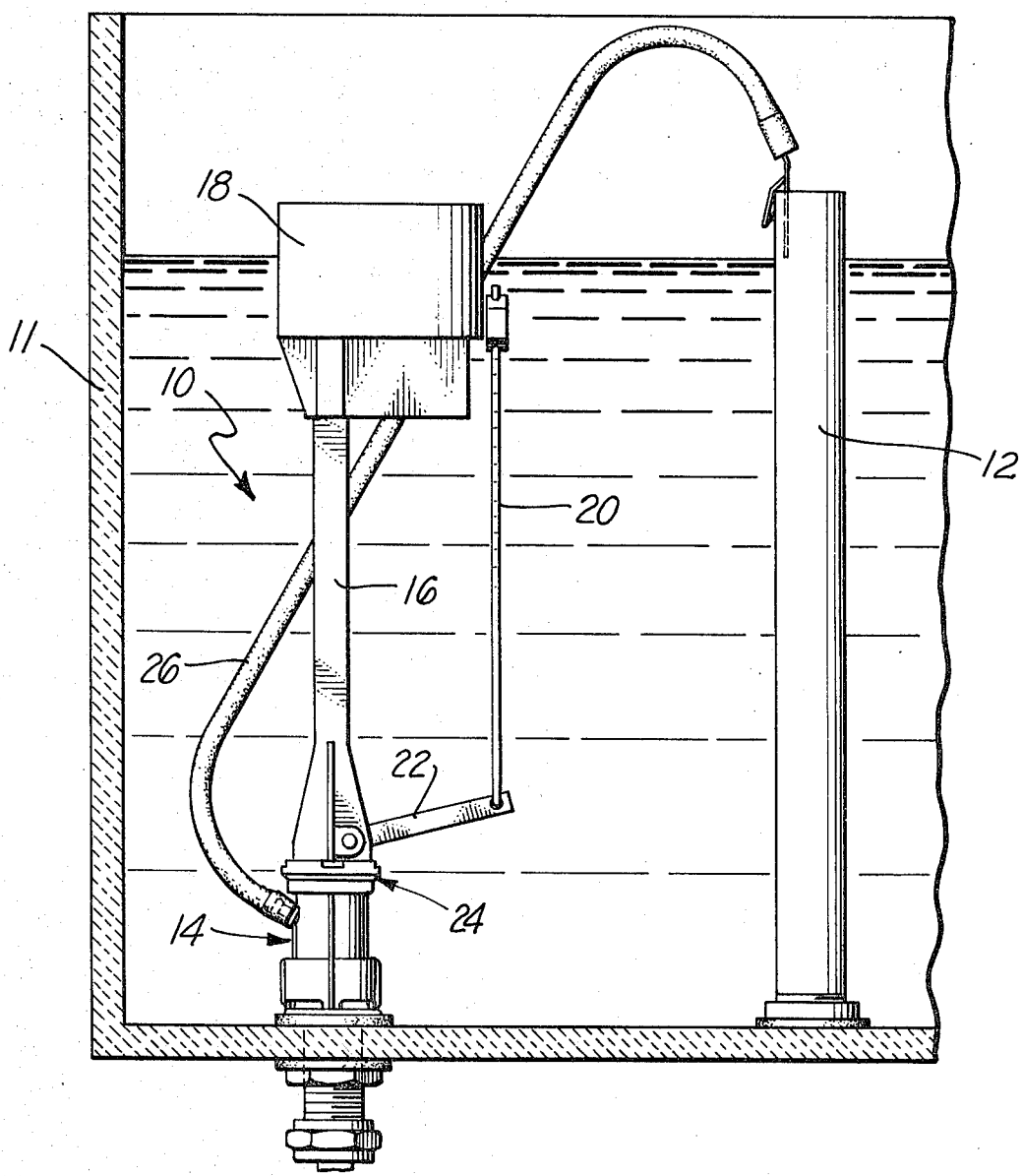
FIG. 1 is a side elevational view of an embodiment of ball cock incorporating the principles of the present invention and shown mounted in a water or flush tank with the refill hose thereof connected to a refill tube.

Referring particularly to FIG. 1 of the drawings, the embodiment of ball cock incorporating the principles of the present invention is generally indicated at 10 and is mounted in a usual water or flush tank 11 for controlling the water inflow and water level therein, as well as the water flow into an upper open end of a refill tube 12. As shown, the ball cock 10 includes a lower assembly generally indicated at 14 having an upright mast or guide 16 secured thereto with said guide receiving a vertically movably float 18 thereon. The float 18 is operably connected through a connecting arm 20 and a valve operating lever 22 to a valve assembly generally indicated at 24 and forming a part of the lower assembly 14.

Thus, a dropping of the water level in the water tank 11 results in a downward movement of the float 18 causing the valve assembly 24 to open and permit an inflow of water through the lower assembly 14 into the interior of the water tank. At the same time, a portion of the water flowing through the lower assembly 14 is directed into a refill hose 26 and into the refill tube 12. As the water level rises in the water tank 11, the float 18 will ultimately close the valve assembly 24 and stop the flow of water into the water tank and refill tube 12.

More particularly to the principles of the present invention and referring to FIGS. 2 through 5, the ball cock lower assembly 14 is comprised of a preferably metal water inlet member generally indicated at 28, the valve assembly 24 having a preferably metal lower housing portion generally indicated at 30 and a preferably plastic material water outlet member generally indicated at 32. The water inlet member 28 is secured extending upwardly into the tank 11 sealed therewith by an annular flange 34 thereof downwardly compressing a usual resilient seal 36. Furthermore, the water inlet member 28 includes a frustoconical portion 38 upwardly from the annular flange 34, then an enlarged cylindrical portion 40, and finally a reduced cylindrical portion 42 terminating upwardly in an upper open end 44 of the water inlet member.

The lower housing portion 30 of the valve assembly 24 is formed centrally with a downwardly opening inlet neck 46 telescoping the reduced cylindrical portion 42 of the water inlet member 28, the particular assembly thereof to be hereinafter described more in detail. An integral annular valve seat 48 is formed on the valve lower housing portion 30 surrounding the inlet neck 46, and a series of water outlet openings 50 are formed through the valve lower housing portion 30 outwardly of the valve seat 48 and opening downwardly, outwardly around the water inlet member 28. Still further for important purposes of the present invention, the valve lower housing portion 30 is formed with an annular, preferably flat, sealing surface 52 outwardly continuously circularly surrounding the water outlet openings 50 and directly overlying a continuously circular upper end 54 of an annular wall 56 of the water outlet member 32.

As described more in detail in our said prior U.S. Pat. No. 3,429,333, the valve assembly 24 also includes internally thereof a resilient material sealing member 58 having an annular portion movable toward and away from the annular valve seat 48 of the lower housing portion 30 by operation of the valve assembly through the valve operating lever 22 by its controlling connected float 18. As shown in FIG. 2, the resilient sealing member 58 is in sealing position downwardly against the annular valve seat 48 and preventing the flow of water from the water inlet member 28 over this valve seat. As previously briefly described, when the water level in the tank 11 drops sufficiently permitting the float 18 to move downwardly and open the valve assembly 24 through movement of the valve operating lever 22, the resilient sealing member 58 moves upwardly away from the valve seat 48 and permits the flow of water from the water inlet member 28 over the valve seat 48 and downwardly outwardly of the valve lower housing portion 30 through the water outlet openings 50.

The water outlet member 32 as previously stated is preferably formed of plastic and preferably by injection molding, in view of the complex configuration thereof. More particularly, the water outlet member 32 is generally tubular in configuration outwardly telescoping the water inlet member 28 with the continuously circular upper end 54 thereof tightly sealingly abutting the sealing surface 52 of the valve lower housing portion 30, as previously described. A lower end 60 of the water outlet member 32 preferably rests on the annular flange 34 of the water inlet member 28, thereby retaining the water outlet member secured surrounding the water inlet member 28.

As best seen in FIGS. 3 and 5, the wall circular upper end 54 of the water outlet member 32 is preferably formed with a relatively thin cross section, continuously circular sealing ring portion 62 which serves as the abutment against the annular sealing surface 52 of the valve lower housing portion 30 as shown in FIG. 2 and accomplishes the outward sealing between the water outlet member and the valve lower housing portion. Directly underlying the valve lower housing portion 30, the annular wall 56 of the water outlet member 32 forms and upper water outlet chamber 64 communicating inwardly through a slotted flange 66 with the outer sides of the inlet neck 46 on the valve lower housing portion 30 and the reduced cylindrical portion 42 on the water inlet member 28, then downwardly along the enlarged cylindrical portion 40 of the water inlet member 28 through a series of spaced slots 68 shown in FIG. 4, and then outwardly into a lower water outlet chamber 70 over a baffle 72 into the interior of the tank 11 through a series of spaced outlet openings 74.

An integral refill hose connection nipple 76 is formed on and through an annular wall 56 of the water outlet member 32 spaced below the wall upper end 54 and between this upper end and the lower outlet openings 74 from the lower water outlet chamber 70. The refill hose connecting nipple 76 communicates inwardly with the upper water outlet chamber 64 and outwardly of the water outlet member wall 56 is telescoped by the end of the refill hose 26. Important to the principles of the present invention, this refill hose connection nipple 76 is positioned angling upwardly from the water outlet member wall 56 generally in the direction of the valve assembly 24 with the refill hose 26 extending angularly upwardly by the valve assembly in a relatively gentle curve. Also, the inner end of the refill hose connection nipple 76 is guarded by a series of spaced, water straining or filtering fingers 78 within the upper water outlet chamber 64, spaced slightly inwardly from the water outlet member wall 56 and spaced downwardly from the wall upper end 54, said fingers being downwardly integrally connected to said wall as best seen in FIGS. 2 and 3.

In production assembly of the ball cock lower assembly 14, the water outlet member 32 is positioned telescoped downwardly over the water inlet member 28 and the valve lower housing portion 30 is forced downwardly with the housing portion inlet neck 46 pressed tightly telescoping the reduced cylindrical portion 42 of the water inlet member 28. Simultaneously with this pressed fit between the water inlet member 28 and the valve lower housing portion 30, the annular sealing surface 52 of the valve lower housing portion is seated downwardly tightly abutting the continuously circular sealing ring portion 62 on the wall upper end 54 of the water outlet member 32. In view of the fact that the water outlet member upper end 54 and the sealing ring portion 62 thereon are continuously circular and are unbroken in configuration by the refill hose connection nipple 76, this pressed fit assembly may be quickly and easily accomplished without danger of misalignment and with the virtual elimination of the possibility of misaligned defective parts.

After the press fit assembly between the water inlet member 28, the valve lower housing portions 30 and the water outlet member 32, if it is desired to provide further securement to assure the retainment and the sealing engagement, additional metal forming operations between the water inlet member and the valve lower housing portion may be accomplished. Also, if circumstances dictate, soldering or brazing of the usual forms may be placed between the water inlet member 28 and the valve lower housing portion 30, again for a more secure retainment therebetween. In most instances, however, neither form of additional securement will be required and the mere described press fit assembly will retain the various components properly positioned for the described functioning.

In general, operation of the ball cock 10 of the present invention, when the float 18 is maintained at the upper end of its vertical movement by a proper water level in the tank 11, the valve assembly 24 is maintained closed with the resilient sealing member 58 thereof positioned tightly downwardly against the valve seat 48 of the valve lower housing portion 30 and preventing the flow of water from the water inlet member 28. Upon a dropping of the water level in the tank 11, the float 18 moves vertically downwardly, opening the valve assembly 24 are previously described and permitting movement of the valve resilient sealing member 58 upwardly away from the valve seat 48. The water then flows from the water inlet member 28, over the valve seat 48, downwardly through the water outlet openings 50 into the upper water outlet chamber 64 of the water outlet member 32, and circuitously downwardly along the water outlet member through the lower water outlet chamber openings 74. At the same time, a portion of the water entering the upper water outlet chamber 64 of the water outlet member 32 passes outwardly through the filtering fingers 78 and the refill hose connection nipple 76, through the refill hose 26 and into the upper end of the refill tube 12.

According to the present invention, therefore, a ball cock 10 is provided having an improved sealing between a preferably metal valve lower housing portion 30 and a preferably plastic water outlet member upper end 54. By removing the refill hose connection nipple 76, downwardly away from the water outlet member upper end 54 so as to maintain this upper end continuously circular, it is possible to production-assemble the ball cock lower assembly 14 virtually without the occurence of defectively assembled parts. Furthermore, by positioning the refill hose connection nipple 76 angling upwardly from the water outlet member 32, the refill hose 26 connected thereto is not required to severely curve upwardly past the valve assembly 24 to the upper end of the refill tube 12, thereby greatly reducing the chances of failure caused by flexing of the resilient refill hose as a result of impulses caused by the water control and movement.

We claim:

1. In a ball cock for controlling the flow of water into and the water level within a water tank; said ball cock being of the type having a water inlet member, a valve assembly pressed onto an end of said water inlet member receiving water centrally into a valve housing thereof over an annular valve seat and from said housing through housing outlet openings, said housing outlet openings directing said water reversely around an outer side of said water inlet member, and a float operably connected to sealing means of said valve assembly for controlling the flow of water over said valve seat and from said housing outlet openings; then improvements comprising: a water outlet member telescoped surrounding said water inlet member having an annular end underlying said valve housing outwardly of said housing outlet openings, said outlet member end forming a circular edge tightly abutting said valve housing and sealing against said valve housing during said pressing of said valve assembly onto said water inlet member end, the positioning of said outlet member end forming a water outlet chamber between said inlet and outlet members communicating with said valve housing outlet openings, water outlet openings through said water outlet member spaced from said valve housing and water outlet chamber to internally of said water tank, and refill hose outlet means through said water outlet member spaced from said outlet member end and between said valve housing and said outlet member outlet openings, said refill hose outlet means being adapted for connection to a refill hose extending generally by said valve assembly and into a refill tube of said water tank, said refill hose outlet means including series of closely spaced fingers within said water outlet chamber of said outlet member overlying a refill hose outlet communicating through said outlet member and said fingers being positioned in said outlet member outlet chamber spaced from said outlet member end and between said valve housing and said outlet member outlet openings.

2. A ball cock as defined in claim 1 in which said refill hose outlet means includes said refill hose outlet extending angularly through said outlet member and angularly generally toward said valve assembly.

3. A ball cock as defined in claim 1 in which said water inlet member and said valve housing are formed of metal; in which said water outlet member is formed of plastic; in which said outlet member ends includes a continuously circular, thin sealing ring formed integrally thereon and forming said circular edge tightly abutting said valve housing and sealing against said valve housing; and in which said refill hose outlet means includes said refill hose outlet extending angularly through said outlet member and angularly generally toward said valve assembly.